United States Patent [19]

Thayer

[11] Patent Number: 5,683,033
[45] Date of Patent: Nov. 4, 1997

[54] ROCKET NOZZLE FOR A ROCKET ENGINE

[75] Inventor: Edward B. Thayer, Jupiter, Fla.

[73] Assignee: United Technologies Corporation, Hartford, Conn.

[21] Appl. No.: 629,112

[22] Filed: Dec. 11, 1990

Related U.S. Application Data

[63] Continuation of Ser. No. 308,158, Feb. 8, 1989, abandoned.

[51] Int. Cl.⁶ .................. B63H 25/46; B05B 12/00; F02C 7/10
[52] U.S. Cl. .................. 239/265.17; 239/265.31; 239/265.39; 60/39.511; 60/39.53
[58] Field of Search .................. 60/39.53, 39.51, 60/39.511; 239/265.17, 265.31, 265.39

[56] References Cited

U.S. PATENT DOCUMENTS

| 3,469,787 | 9/1969 | Marsh et al. | 239/127.3 |
| 3,563,467 | 2/1971 | Marsh et al. | 239/265.17 |
| 3,712,546 | 1/1973 | Kaufmann | 239/265.11 |
| 3,925,982 | 12/1975 | Mueller | 60/242 |

FOREIGN PATENT DOCUMENTS 654344  6/1951  United Kingdom.

*Primary Examiner*—Peter A. Nelson
*Attorney, Agent, or Firm*—Gene D. Fleischhauer

[57] ABSTRACT

This invention relates to rocket engines which have a rocket nozzle for expanding hot, highly pressurized rocket gases and more particularly, to a high expansion ratio nozzle for such an engine.

7 Claims, 7 Drawing Sheets

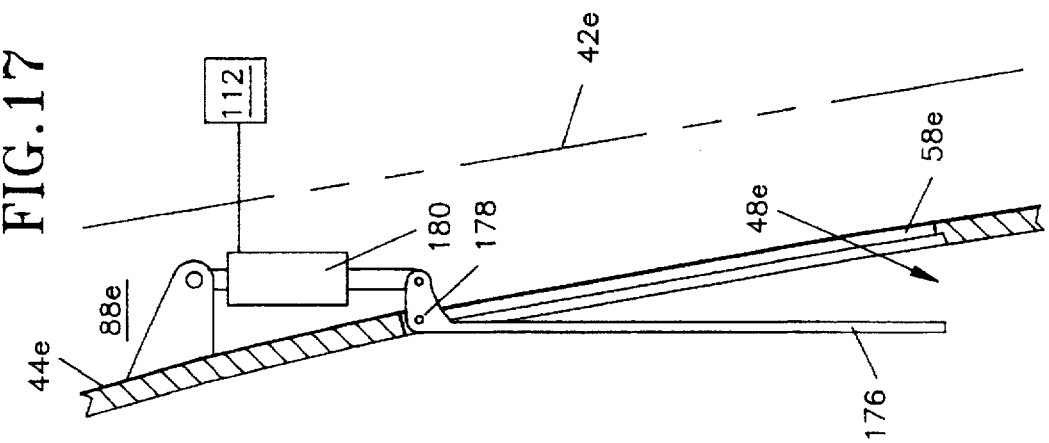
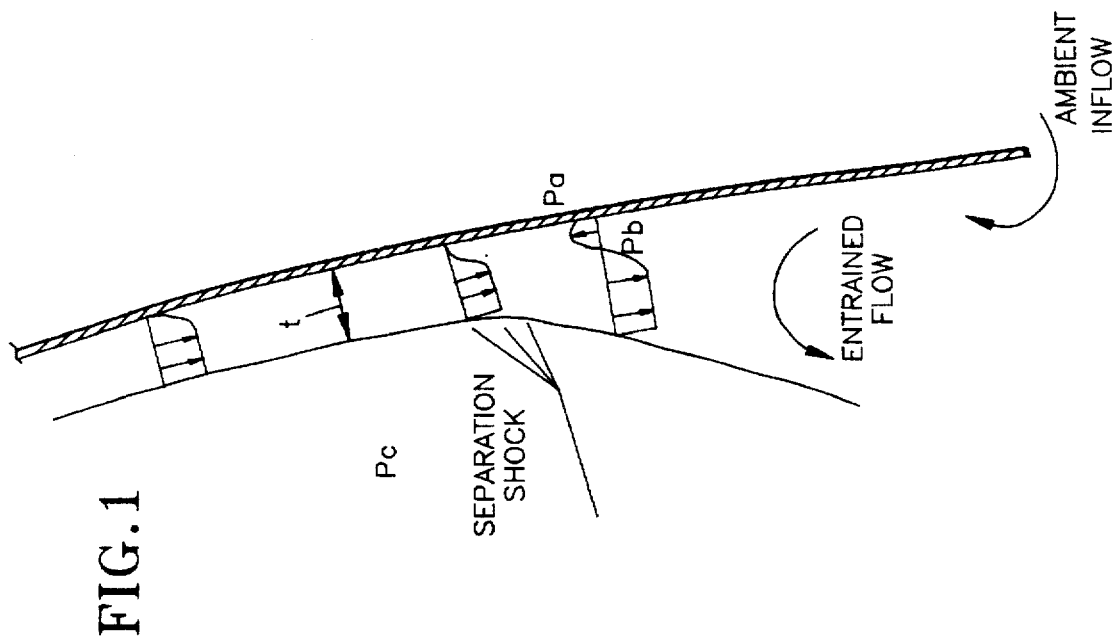

FIG.6
FIG.4
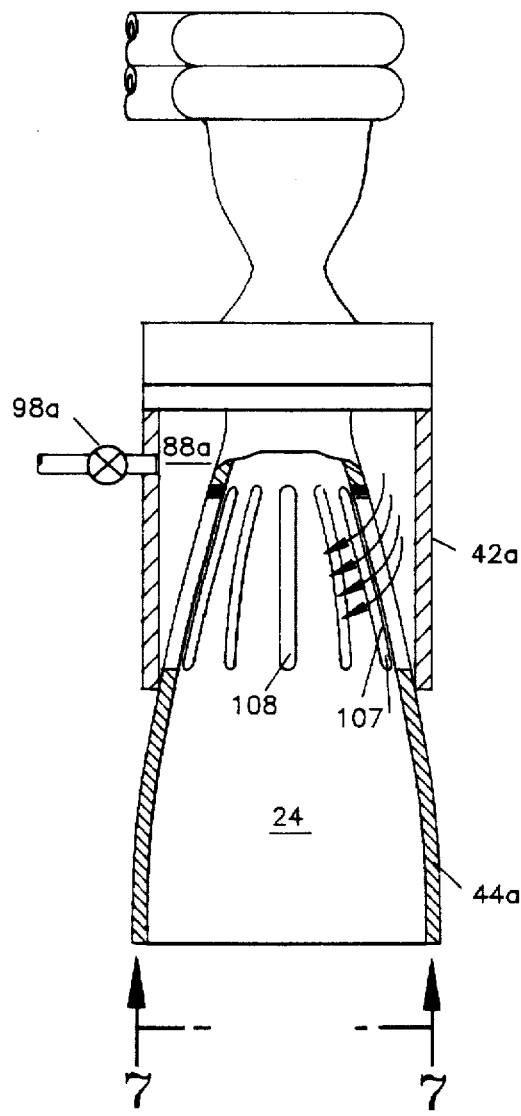
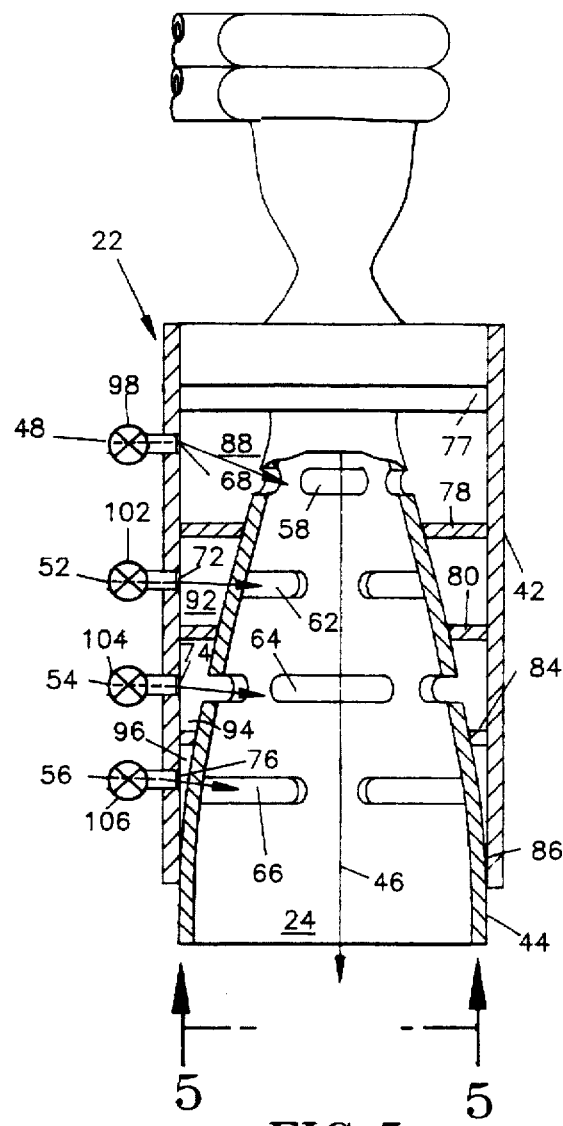
FIG.7
FIG.5
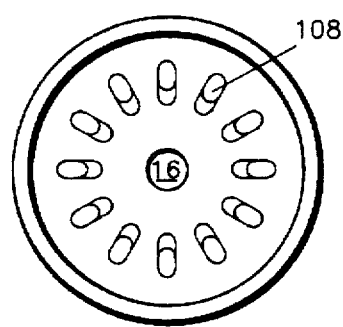
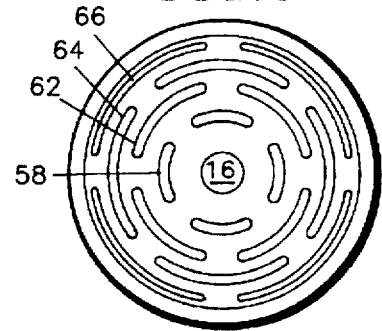

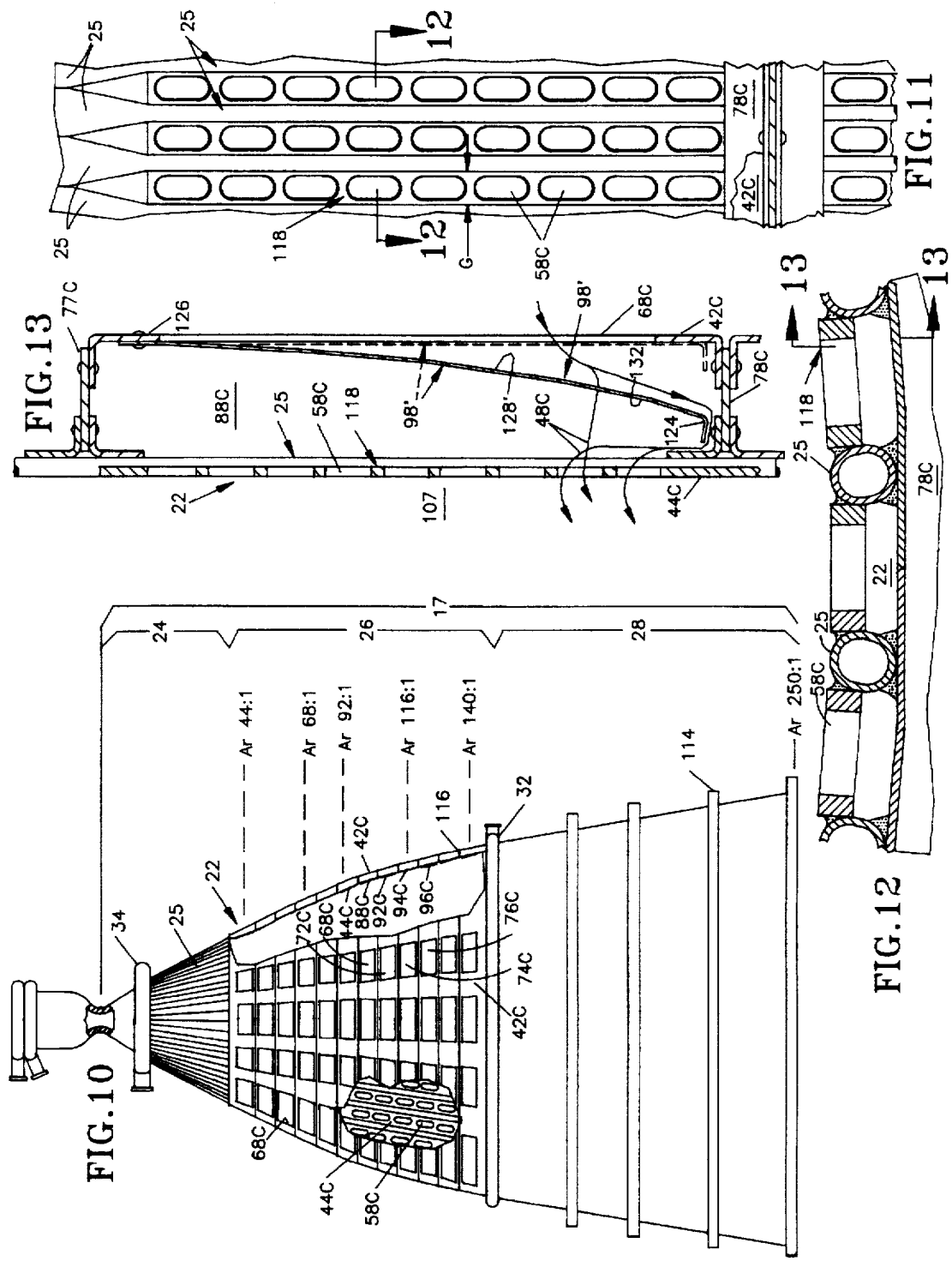

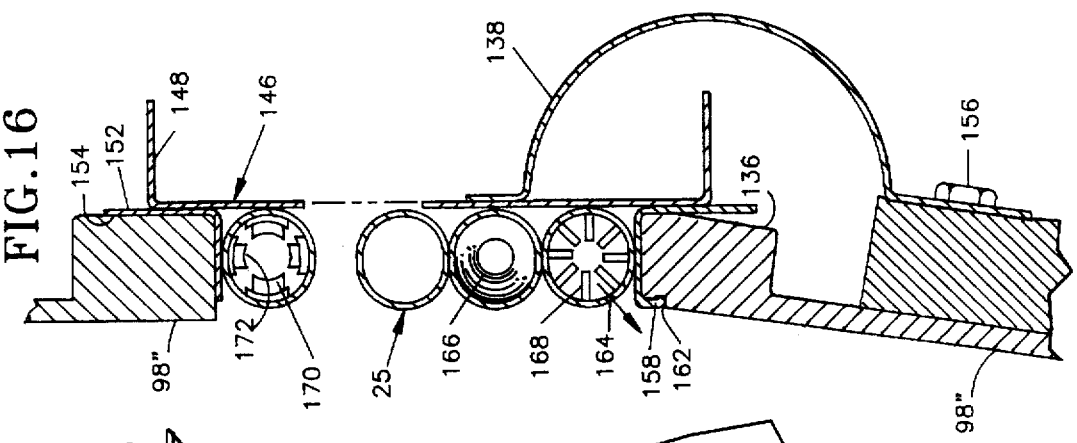
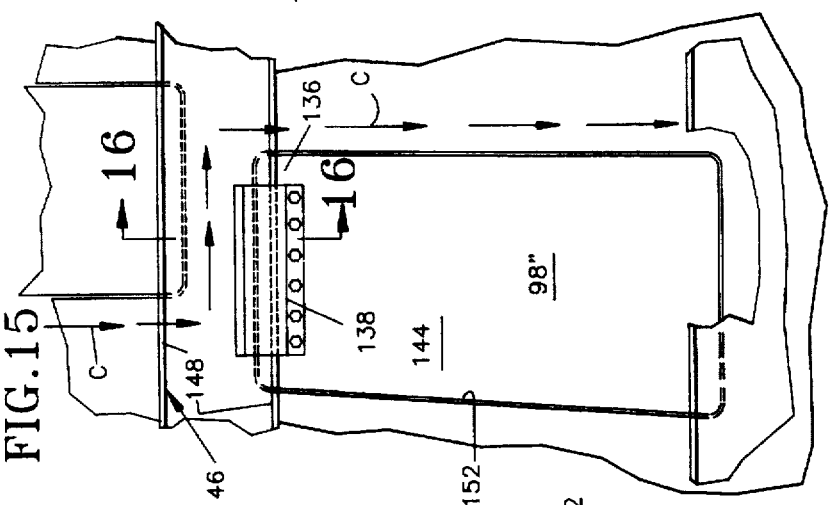
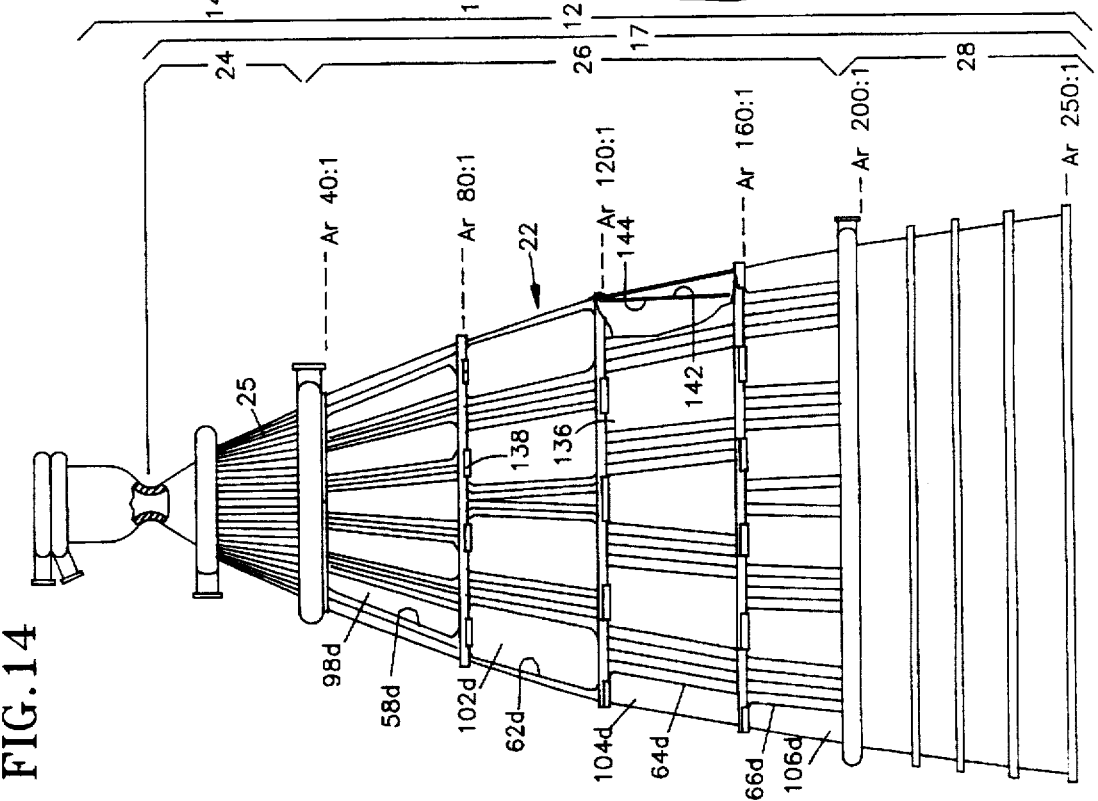

ROCKET NOZZLE FOR A ROCKET ENGINE

REFERENCE TO RELATED APPLICATION

This application is a continuation of Ser. No. 308,158, filed on Feb. 8, 1989 and now abandoned.

BACKGROUND OF THE INVENTION

One example of a rocket engine is the RL10 rocket engine manufactured by the Pratt & Whitney Group of the assignee of this application. Three major components of this engine are a turbopump, a combustion chamber and a rocket nozzle.

During operation of the rocket engine, the turbopump is used to supply a fuel and oxidant, such as liquid hydrogen and liquid oxygen, to the combustion chamber. The liquid oxygen and liquid hydrogen are expanded in the combustion chamber and burned to produce hot, pressurized rocket gases. The hot, pressurized gases are flowed at high velocities to the exhaust nozzle. The exhaust nozzle allows further expansion of the gases to increase the velocity of the gases before the gases exit the engine, thereby increasing the thrust of the rocket engine.

The exhaust nozzle is fabricated from thin walled tubes that are tapered and shaped to form the required nozzle contour. Liquid hydrogen fuel is flowed through these tubes to provide convective cooling to the tubes and regenerative heating to the hydrogen fuel. The convective cooling ensures that the temperature of the tubes is consistent with the temperature limits required for structural integrity of the nozzle.

Two important parameters of an exhaust nozzle are the expansion ratio of the nozzle at the exit and the pressure ratio of the nozzle under operative conditions. The pressure ratio is the total pressure $P_c$ (i.e., combustion chamber pressure) of the exhaust nozzle divided by the total pressure $P_a$ of the ambient environment to which the rocket gases are discharged. the expansion ratio is the area ratio at the exit of the nozzle. The expansion EREA ratio at any location of the nozzle is the area of the nozzle at the location divided by the area of the throat of the nozzle.

The exhaust nozzle will flow "full" without separation of the boundary layer of the gases from wall of the nozzle if the pressure ratio is high enough. However, if the pressure ratio is too low for the required amount of expansion, then the flow will separate from the nozzle wall or casing which bounds the flowpath for the rocket gases. Aerodynamic losses will result.

This is caused in part by the static pressure in the wall region dropping well below ambient as the flow expands through a supersonic, overexpanded nozzle. As shown in FIG. 1, the boundary layer thickness increases with area ratio and the boundary layer has a portion which is subsonic. Ambient pressure is transmitted upstream through the subsonic portion of the boundary layer. Under the influence of this adverse pressure gradient, the subsonic portion of the boundary layer slows and thickens. Then, the flow separates from the nozzle wall and induces the formation of shock waves which cause the primary overexpanded supersonic flow to adjust to the pressure of the inflowing ambient air.

For three-dimensional flow nozzles, the flow separation begins at a point on the nozzle wall rather than at a single area ratio plane normal to the centerline. This is because the pressure in the boundary layer for any one area ratio is subject to the random fluctuations that are characteristic of turbulent flow.

The ambient pressure of the inflowing air varies with altitude. At sea level, the pressure on the exterior of the nozzle and of the inflowing air is about fourteen and seven tenths pounds per square inch (14.7 psia). The total pressure on the interior of the nozzle, for example at a downstream location, might approach fifteen hundred pounds per square inch (1500 psi) with a static pressure of about fifteen pounds per square inch (15 psia). The pressure $P_b$ in the boundary layer might be in the order of two or three (2–3) pounds per square inch. The pressure differential may impose large side loads on the wall casing of the nozzle which surrounds the gas flow path.

Separation such as occurs when using a high area ratio exhaust nozzle at low pressure ratios may cause unstable flow separation, that is, the separation location may oscillate fore and aft, and side to side with high frequency. This results in large fluctuating side loads. The fluctuating side loads are particularly troublesome in rockets because of the effect the side loads have on the trajectory of the rocket and because the side loads can cause destructive vibrations in the exhaust nozzle.

As the rocket driven vehicle travels from sea level to a high altitude above the earth's surface, (for example, 200,000 feet) the rocket nozzle will operate at pressure ratios ($P_c/P_a$) which vary dramatically from low pressure ratios at sea level to high pressure ratios at altitude. This results from the large variation in ambient pressure which decreases from about fourteen pounds per square inch (14.7 psia) at sea level to pressures as low as one-tenth of a pound per square inch (0.1 psia) at one hundred thousand feet (100,000 ft.) of altitude. Thus, it is difficult to avoid separation of flow in a typical fixed-geometry rocket nozzle.

FIG. 2 is an exemplary curve showing the relationship of the separation area ratio $A_r$ for a nozzle as a function of the pressure ratio at which the nozzle is operated. For a given pressure ratio of the rocket nozzle, separated flow will occur in the chamber at area ratios above the separation area ratio. For example, at a pressure ratio of two hundred the exhaust nozzle will flow "full" at an area ratio less than about 68:1 and will flow separated at an area ratio greater than 68:1 with overexpansion of the flow and unstable separation occurring at an axial location corresponding to about the area ratio of 68:1 of the nozzle. If separation were the only concern, the ideal nozzle would have an area ratio at the exit which is equal to the area ratio at which separation occurs.

One solution, then, is to employ an exhaust nozzle having a maximum area ratio which, for the operative pressure ratios, causes the nozzle to flow full from take-off until the rocket reaches its final altitude. However, this reduces the efficiency of the rocket at high altitudes because of the low velocities of the exiting flow. These low velocities are associated with the small, gradual expansion of area used to avoid separation at low pressure ratios which occur at sea level take-off.

Creating a vehicle having several stages is another approach to tailoring the nozzle area ratio and pressure ratio to avoid separation. Each stage has a nozzle having area ratios designed for a limited range of pressure ratios. The nozzle would have a first stage having a low area ratio at sea level launch and another stage having a high area ratio at high altitude orbit. Multi-stage rocket engines are more complex than single stage rocket engines and increase the complexity of operation. However, such a rocket has the advantage of increased thrust as the rocket reaches orbit.

The above art notwithstanding, scientists and engineers have been working under the direction of Applicants' assignee to develop a rocket engine having an exhaust nozzle which would eliminate the requirement for staging;

and, have a high expansion ratio (that is, greater than 150:1) for good thrust at altitude while not having unacceptably large unstable separation.

DISCLOSURE OF INVENTION

This invention is predicated in part on the recognition that flow from the exterior to the interior of the exhaust nozzle through the casing into a zone having separated flow is capable of stabilizing the location of separation and reducing the internal drag associated with such separation.

According to the present invention, a rocket nozzle having a high expansion chamber includes a plurality of vent passages extending from the exterior to the interior of the chamber for stabilizing the location of separation under operative conditions that have a low pressure ratio; and, includes a device responsive to the pressure ratio of the nozzle for closing the passages as the pressure ratio increases In accordance with one embodiment of the present invention, a plurality of seal elements which extend axially from the casing are, in the direction of differential pressure across the seal element, are movable between an 1. Open position which permits in flow through the vent passage and to 2. a closed position which blocks outflow through the vent passage.

According to the present invention, a method of operating a rocket engine includes 1. the step of operating the engine with a pressure ratio and at an area ratio of the nozzle which results in a separated flow zone and a full flow zone within the rocket chamber and 2. the step of opening vent passages in the casing of the nozzle to place the separation zone in flow communication with ambient atmosphere to stabilize flow separation in the rocket chamber. In still another embodiment, gas is provided to the separation zone at a pressure which is greater than the ambient pressure.

A primary feature of the present invention is a rocket nozzle having a high expansion area ratio, which is operable at low pressure ratios at low altitudes and at high pressure ratios at high altitudes. Another feature is a casing for the nozzle which surrounds the divergent section (expansion chamber) of the nozzle. A portion of the casing has a plurality of vent passages which extend through the casing to place the interior in flow communication with the exterior. In one embodiment, at least one manifold extends about the casing and has a valve means for interrupting flow from the interior to the exterior at high pressures in the wall region and for permitting flow from the exterior to the interior at low pressures in the wall region. In one embodiment, the device for interrupting a flow is a check valve. In another embodiment, the device for interrupting flow is a door which is positively positioned by an actuator in response to a pressure signal or altitude signal from a control means. In another embodiment, the doors are thin, relatively flexible members or seal elements which are movable from an open position to a closed position in response to pressure forces acting the seal element.

A primary advantage of the present invention is the efficiency and simplicity of a rocket engine having a single nozzle which provides a high expansion ratio with stable separation under operative low pressure ratios of the rocket engine. Another advantage is the internal drag which results from pressurizing the separation zone of the rocket chamber. Still another advantage in one embodiment is the simplicity of the venting scheme which relies on the difference in pressure between the exterior and the interior to supply the force to allow or interrupt flow between the exterior and in the interior of the chamber.

The foregoing features and advantages of the present invention will become more apparent in light of the following detailed description of the best mode of carrying out the invention and the accompanying drawings.

BRIEF DESCRIPTION OF THE DRAWINGS

FIG. 1 is a schematic illustration of a nozzle wall showing separation of the boundary layer and accompanying pressures.

FIG. 4 is a schematic representation of a side elevation view of the rocket engine shown in FIG. 3.

FIG. 5 is a view taken along the line 5—5 of FIG. 4.

FIG. 6 is an alternate embodiment of the configuration shown in FIG. 4.

FIG. 7 is a view taken along the line 7—7 of FIG. 6.

FIG. 10 is a side elevation view of a portion of the divergent region of an exhaust nozzle of the type shown in FIG. 3.

FIG. 11 is an enlarged view from above of a portion of the divergent region of the nozzle shown in FIG. 10.

FIG. 12 is a view taken along the line 12—12 of FIG. 11.

FIG. 13 is a view taken along the line 13—13 of FIG. 12.

FIG. 14 is an alternate of the exhaust nozzle shown in FIG. 10.

FIG. 15 is an enlarged view of a portion of the casing shown in FIG. 14.

FIG. 16 is an enlarged view taken along the line 16—16 of FIG. 15.

FIG. 17 is an alternate embodiment of the construction shown in FIG. 8.

BEST MODE FOR CARRYING OUT THE INVENTION

Figure 3:
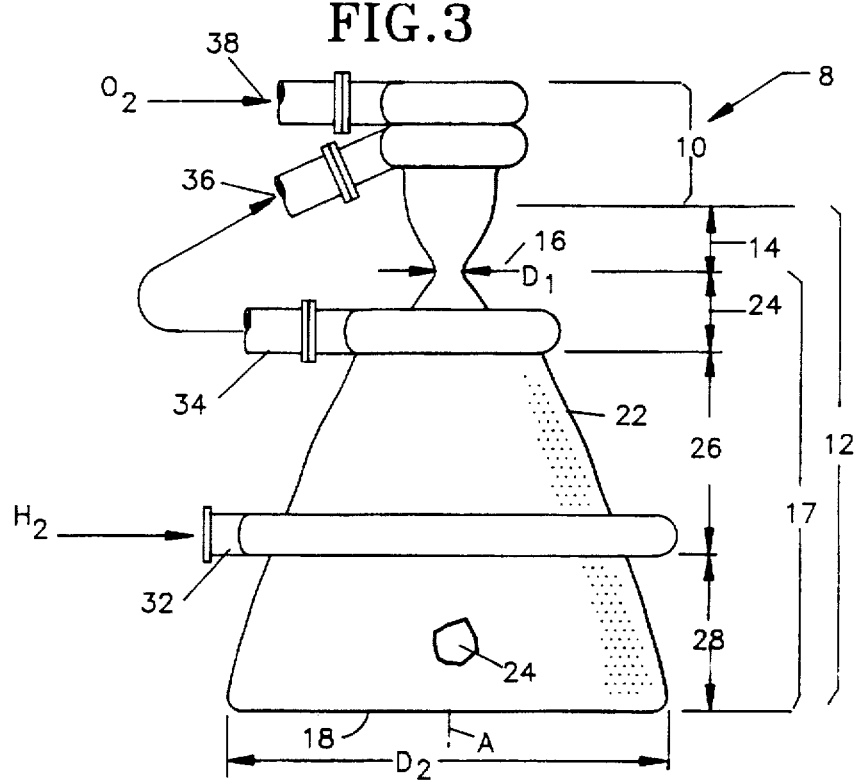
FIG. 3 is a schematic representation of a portion of a rocket engine with portions of the nozzle and cooling system broken away for clarity.

FIG. 3 is a schematic representation of a portion of a rocket engine 8 with a portion of the cooling system broken away for clarity. The rocket engine includes a combustion or thrust chamber 10 and an exhaust nozzle 12. The exhaust nozzle has a convergent region 14, a throat 16, a divergent region 17 and an exit 18. The throat has a diameter $D_1$ and the exit has a diameter $D_2$. The ratio of the area of the nozzle at any axial location to the area of the throat is the area ratio of the nozzle at that location.

The exhaust nozzle 12 has a casing 22 which extends about the axis A of the nozzle. The casing bounds the thrust chamber 10, the convergent region 14 and the divergent region 17. An exhaust chamber 24 is disposed on the interior of the casing in the divergent region of the nozzle.

The divergent region of the casing is divided into three sections. A first section 24 extends from the throat 16 of the nozzle out to an area ratio of about 40 to 1. The first section is formed of a plurality of axially extending tubes 25 for coolant (not shown in detail) which are joined together to form the contour of the casing. The second section 26 is a continuation of the tubes. The tubes in the second section are spaced apart to allow for ventilation ports (not shown).

A third section 28 extends from the second section to the exit 18 of the nozzle. The third section is a fixed extension which is integrally attached to the second section of the nozzle. The third section of the nozzle does not have axially extending cooling tubes.

Coolant manifolds 32 and 34 are used to flow hydrogen to the cooling tubes 25 extending through the second section of the nozzle and to supply hydrogen to the thrust chamber. The hydrogen is regeneratively heated as the tubes are cooled. Coolant manifolds (not shown) are also used to supply coolant to the tubes in the first section of the exhaust nozzle.

The thrust chamber includes an inlet manifold 36 for the regeneratively heated liquid hydrogen fuel; and, an inlet manifold 38 for the liquid oxygen oxidant. The fuel and oxidant are flowed into the thrust chamber via an injector (not shown). An igniter (not shown) is also disposed in the thrust chamber.

FIG. 4 is a schematic representation of a side elevation view of the rocket engine shown in FIG. 3., partly in full and partly broken away. The casing 22 has an outer wall 42 and an inner wall 44. A flow path 46 for working medium gases extends axially through the chamber 24 of the exhaust nozzle. A plurality of vent passages for venting the interior of the exhaust nozzle, as represented by the flow paths 48, 52, 54, and 56, extend inwardly through the casing 22 to the interior or chamber 24 of the exhaust nozzle.

The inner wall 44 of the casing 22 has a plurality of openings as represented by the openings 58, 62, 64 and 66 which extend through the first or inner wall of the casing. The outer casing 42 has a plurality of openings, as represented by the openings 68, 72, 74, and 76 which extend through the second or outer wall 42. Radial walls 77, 78, 82, 84 interrupt the cavity leaving manifolds 88, 92, 94, and 96 therebetween. The inner wall and the outer wall are joined at 86 to bound the manifold 96. The manifolds and associated openings provide the vent passage for each of the flow paths, as for example, the vent passage 48 for a flowpath formed by the openings 58 in the inner wall, the manifold 88, and the openings 68 in the outer wall.

A plurality of check valves at each opening in the outer wall, as represented by the check valves 98, 102, 104 and 106, are representative of means for placing the vent passage in flow communication with the exterior of the nozzle and with the interior of the nozzle. Each check valve could be located at any location that permits flow inwardly through the associated passage at operative conditions under which the exterior pressure exceeds the interior pressure adjacent the inner wall. The check valve blocks the flow of gases from the interior of the nozzle under operative engine conditions at which the chamber pressure adjacent the wall exceeds the pressure on the exterior of the nozzle.

Accordingly, the check valves are means responsive to the pressure ratio between the exterior of the exhaust nozzle and the interior of the exhaust nozzle at a location adjacent to the wall in the wall region of the exhaust nozzle.

FIG. 5 is a view taken along the lines 5—5 of FIG. 4 showing the relationship of the openings 58, 62, 64 and 66 to the circumference of the nozzle. As can be seen, the slots have a high aspect ratio with respect to the axial direction, that is, the circumferential length of each slot is greater than the axial length of each slot. The area of the slots is approximately equal to twenty percent of the area of the nozzle exit.

FIG. 6 is an alternate embodiment of the configuration shown in FIG. 4 having a plurality of axially extending openings 108. The openings 108 have a low aspect ratio with respect to the axial direction of the exhaust nozzle, that is, the slots 108 each have an axial length which several times greater than the axial width of each slot.

A single manifold 88a extends circumferentially about the inner wall 44a and inwardly of the outer wall 42a. A check valve 98A performs the same function as does the check valve 98 shown in FIG. 4.

FIG. 7 is a view of the exhaust nozzle shown in FIG. 6 taken along the line 7—7 of FIG. 6 to show the relationship of the axial slots 108 and to the throat of the exhaust nozzle.

Figure 8:
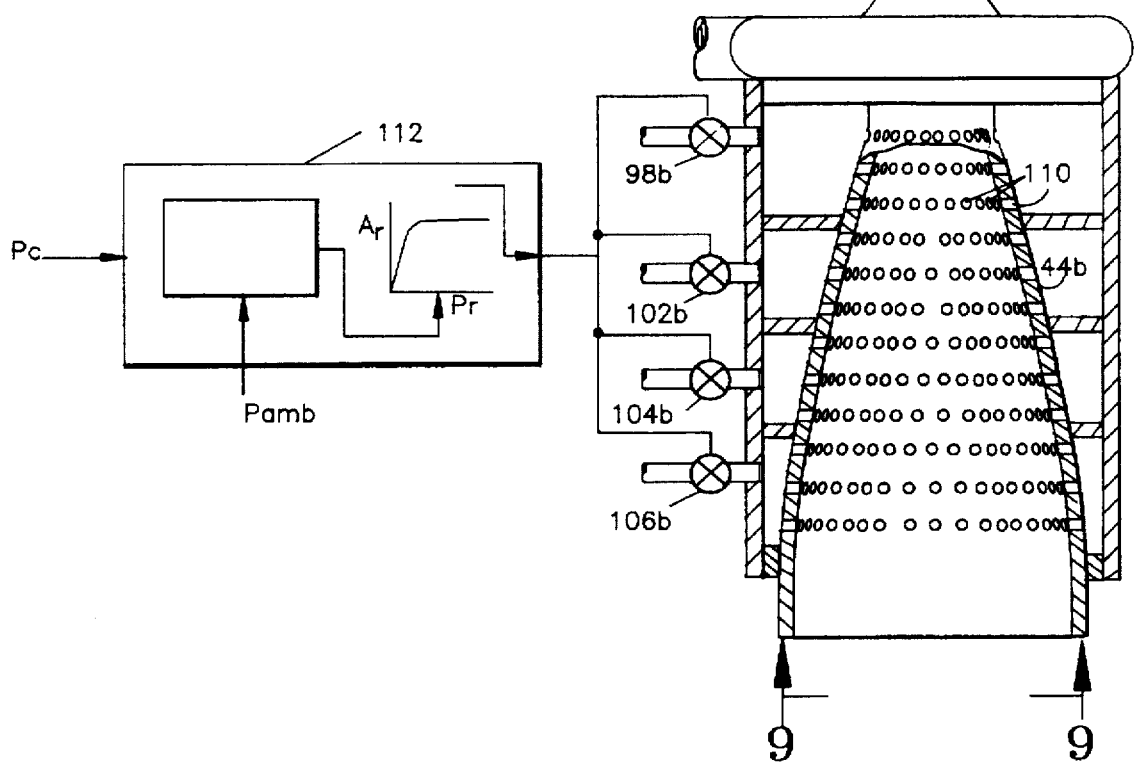
FIG. 8 is an alternate embodiment of the construction shown in FIG. 4.

FIG. 8 is alternate embodiment of the construction shown in FIG. 4. having a plurality of holes 110 through the inner wall 44b of the nozzle. In this particular embodiment, the seal elements or valves 98b, 102b, 104b and 106b are responsive to a control means 112 such as the on board computer for the rocket engine. The control means generates a control signal to the valves 98b, 102b, 104b and 106b to turn the valves on and off.

The control means 112 compares the total pressure of the chamber to the ambient pressure on the exterior of the rocket and generates a pressure ratio signal from which the separation area ratio can be determined. The control means sends a signal to the valves 98b, 102b, 104b and 106b opening the valve associated with the separation area ratio and closing valves upstream of that point. Thus, the flow through the valves 98b, 102b, 104b and 106b will be from the exterior of the rocket engine to the interior wall region under operative conditions at which separation is expected to have occurred adjacent to the wall region.

Figure 9:
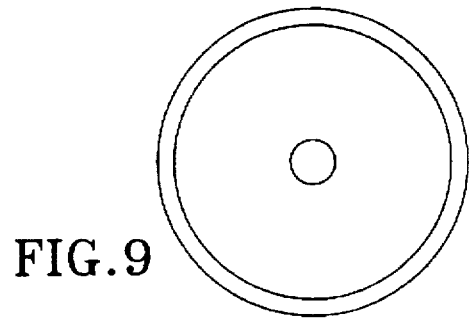
FIG. 9 is a view taken along the line 9—9 of FIG. 8.

FIG. 9 is a view taken along the lines 9—9 of FIG. 8 showing the relationship of the holes 110 to the throat of the exhaust nozzle.

FIG. 10 is a side elevation view partially in section and partially broken away to show in more detail portions of the divergent region 17 of a rocket engine having the type of exhaust nozzle shown in FIG. 3. A plurality of tubes, as represented by the tubes 25, extends axially over a portion of the first section 24 from the coolant exit manifold 34. The plurality of tubes may be formed of three-hundred and sixty (360) individual tubes having a tapering diameter, for example, tapering from a diameter of about a quarter of an inch to a diameter of about four-tenths of an inch at the end of the second section 26. The tubes may be formed of any suitable material having resistance to hydrogen embrittlement, high strength and ductility, weldability and brazeability without requiring a heat treat stress relief cycle. One example of a material for the nozzle tubes in the inlet and exit manifolds is Haynes 230 nickel alloy material. The tubes are joined together with a gold nickel braze.

The second section 26 of the nozzle extends from an area ratio of approximately forty to one (40:1) to an area ratio of about one hundred and forty-four to one (144:1) at which location the coolant inlet manifold 32 is located. The second section of the nozzle has an outer wall 42c and an inner wall 44c. A plurality of openings 58c, 62c 64c and 66c, as represented by the opening 58c, extend through the inner wall. The openings in the outer wall and the inner wall are enlarged many times for clarity.

The outer wall 42c is spaced outwardly from the inner wall. The outer wall extends axially and laterally with respect to the inner wall. The outer wall, has openings as represented by the openings 68c, 72c, 74c and 76c. The outer wall may be formed of an aluminum alloy such as AMS (Aerospace Material Specification) 4027 aluminum alloy.

The third section 28 of the divergent region 17 of the exhaust nozzle is a fixed, radiation-cooled extension that establishes the remaining contour of the divergent section of the exhaust nozzle. The extension of the third section extends from an area ratio of about 144:1 to an area ratio of 250:1. The location of the regenerative tube cooling-radiation cooling interface between the second region 26 and the third region 28 is established by the requirements for adequate film cooling. The cooling tubes are modified in ways discussed below which cause the cooling fluid to cool the tubes to a temperature which is less than half the temperature to which the tubes are cooled for structural reasons. This increased cooling causes water condensate to form in the boundary layer of the regenerative nozzle region of the divergent section and to further cool the downstream, radiation-cooled extension.

Integral stiffening bands 114 extend circumferentially about the exterior of the fixed extension to increase the structural rigidity of the fixed extension. The fixed extension may be made of any suitable alloy such as AMS 7852 columbian alloy. In the second section of the divergent region, stiffening bands or bulkheads 116 extend circumferentially about the exterior of the second section. These bulkheads form a plurality of manifolds between the inner wall and the outer wall as represented by the manifolds 88c, 92c, 94c, and 96c.

FIG. 11 is an enlarged view from above showing the transition from the first section 24 and the beginning of the second section 26 of the divergent region of the exhaust nozzle. As shown at area ratio $A_r$ of approximately 38:1, the inner wall has pairs of tubes 25 for coolant which are adjacent and which extend substantially parallel to each other. The tubes are spaced apart leaving a gap G therebetween. An axially extending spacer is disposed between each pair of tubes, as represented by the spacer 118. Fore and aft bulkheads, as represented by the bulkhead 78c, extend circumferentially about the nozzle to form, in cooperation with the outer wall 42c, the manifold 88c.

FIG. 12 is a view taken along the line 12—12 of FIG. 11 showing in more detail the tubes 25 and the adjoining spacer 118. The spacer may be formed of a material having a comparable coefficient of a thermal expansion to the material of the tubes which are formed of Haynes 230 alloy. Oxygen-free copper (AMS 4501) was selected and the entire assembly is gold-nickel brazed which allows field repair of brazed joints without removing the engine/nozzle from the vehicle. The spacer 118 has a standoff 122 which extends locally and radially outwardly from the pacer beneath the bulkhead or manifold wall 78c. The standoff is a local projection from the spacer and the length between standoffs is open and in flow communication with the openings 58c.

FIG. 13 is a view taken along the line 13—13 of FIG. 12 showing in more detail the relationship of the inner wall 44c, the outer wall 42c, and the radially extending bulkheads 77c and 78c. The inner wall is formed of the spacers 118 and the adjacent tubes 25 which extend beyond the spacer in the hole region 58c of the spacer. Thus, the hole opening 58c, the manifold 88c, and the opening 68c in the outer wall define the vent passage 48 along which the associated vent flow path extends.

The outer wall includes means for placing the vent passage 48c in flow communication with the exterior and with the interior of the chamber which is responsive to pressure on the exterior of the exhaust nozzle and on the interior of the nozzle in the wall region 107. As shown in FIG. 13, the means is a plurality of seal elements as represented by the single reed valve 98', which extends axially from the casing 22. The reed valve is formed of a thin, flexible sheet or strip, having a thickness of about, for example, twenty-thousandths (0.020) of an inch, a length of about six and one half inches and width of about five inches. The length to thickness ratio of the reed valve is greater than 200. A suitable material is Inconel X-150 (AMS 5598) and the outer wall is an aluminum AMS 4027 alloy.

The reed valve is movable between an open position, shown in full, and a closed position shown in phantom. In the closed position, the reed valve blocks flow through the passage from the interior to the exterior. In the open position, the reed valve permits flow through the vent passage 48c from the exterior to the interior. A plurality of openings (not shown) in the end 124 of the reed valve permit flow through the end of the reed valve. The other end 126 of the reed valve is attached to the outer wall by any appropriate method such as bonding or, preferably, riveting.

The reed valve has a first side 128 facing the ambient exterior of the nozzle. The reed valve has a second side 132 facing the interior of the nozzle. In a non-operative condition of the engine, the reed valve is in the closed position against the outer wall of the casing 22.

FIG. 14 is an alternate embodiment of the exhaust nozzle shown in FIG. 10. A portion of the first section 24 of the nozzle has 720 tubes 25 formed of Haynes 230 nickel alloy material with a diameter of approximately one quarter of an inch which extend axially through the first section of the divergent region 17 of the exhaust nozzle 12.

The second section 26 of the nozzle extends from an area ratio of approximately forty to one (40:1) to an area ratio of approximately two-hundred to one (200:1). In the second section, the casing 22 is formed of the axially extending tubes 25 and twelve (12) equally spaced, tapered axial slots which provide the openings 58d, 62d, 64d, and 66d. This establishes passages for ventilation flow to provide pressure ratio or altitude compensation at area ratios of approximately 40:1, 80:1, 120:1, and 160:1.

A carbon-carbon composite door at each slot, as represented by the doors 98d, 102d, 104d, and 106d (hereinafter 98") represent means for placing each vent passage in flow communication with the exterior and interior of the nozzle. Each door has a forward end 136 and a hinge 138 which extends from the casing to the door or seal element. The hinge is a spring and spring loads the doors open to the non-operative position shown in FIG. 14. Each door has first side 142 facing the interior of the exhaust nozzle and a second side 144 facing the exterior of the nozzle.

FIG. 15 is an enlarged view of a portion of the casing showing one of the doors of 98" and the hinge 138 at the upstream end 136 of the door. A stiffening band 146 having projections 148 extends circumferentially about the door and beneath the hinge to reinforce the tube construction at the door location. A housing 152 for the door extends rearwardly and inwardly and is joined to the stiffening band and to the tubes 25 to provide a seat for the door. To form the door opening a plurality of axially extending tubes 25 bound the flowpaths for coolant shown by the directional arrows C. The tubes extend axially along the side of the upstream door, (not shown) extend (not shown) circumferentially for a short distance between the upstream and downstream doors. The tubes extend axially along the side of the door until they reach the next door at which point they extend circumferentially for a short distance.

FIG. 16 is an enlarged view taken along the line 16—16 of FIG. 15 to show in greater detail the relationship of the stiffening band 146, the spring 138 and the circumferentially extending portion of the tubes 25 (such as ten tubes of which several are broken away). The downstream door 98" is shown in the open position which is the non-operative position of the door. The housing 152 at its upstream end has an axially extending flange 158 at the upstream end of the door 136 which engages a groove 162 in the door to pivotally trap the door at the upstream end. The spring 138 is attached to the door by bolts 156 which engage a carbon-carbon projection on the blow-in door.

The slots or door openings 58d, 62d, 64d or 66d are circumferentially indexed to allow the routing of coolant tubes as described above. This permits the coolant tubes 25 to specially cool the hinges and prevent local hot spots. The doors located at area ratios of 40:1 and 80:1 require additional cooling to prevent carbon-carbon abrasion during engine operation. This may be accomplished by bleeding hydrogen into the gas path via holes 164 in one or more of the adjacent upstream cooling tubes. Alternatively, the cooling tube might be contoured by a reduction 166 in the tube flow area by swaging or increasing the tube wall thickness to increase the flow velocity through the tube and thus the convective heat transfer coefficient of the tube. Internal devices for increasing heat transfer area and turbulence, such as internal fins 168, swirlers (not shown) and trip strips or other devices to roughen the surface of the tube will increase both the heat transfer area and turbulence and locally increase velocity. The trip strips 170 may be combined with mini swirler vanes 172 angled with respect to the approaching flow to reduce the flow area, roughen the surface, and to trip and direct the flow with a swirling motion.

FIG. 17 is an alternate embodiment of the construction shown in FIG. 8 where the means for interrupting the vent passage 48e is a seal element, such as a vent door 176, positively pivoted at its upstream end 178 by a hydraulic or gas actuator 180. The hydraulic actuator is responsive to control means such as the control means 112 which generates a signal causing the actuator to positively move the door to the open position. The actuator might be disposed in a manifold 88e which extends between the outer wall 42e and the inner wall 44e. This would allow the ventilation flow to be pressurized, for example by placing the flow in communication with a source of pressurized gas such as a small amount of coolant flowed through the adjacent tubes which form the inner wall 44e. The flow from these tubes might also be positively controlled by a valve in flowing communication with the opening 58e, with or without the doors 176.

During operation of the rocket engine shown in FIG. 3 with an exhaust nozzle as shown in FIG. 6, fuel and oxidant are flowed into the combustion or thrust chamber 10. The fuel and oxidant, in this case hydrogen and oxygen, are burned to produce water vapor and hot, high pressure gases. The total pressure of the gases may, for example, approach three thousand (3000) pounds per square inch at the throat and remains constant at any axial location of the nozzle. The static pressure is a constant at any axial location as long as the flow is full, that is, unseparated.

The gases are flowed from the combustion chamber into the exhaust nozzle 12 through the convergent region 14 of the nozzle to the throat 16. The gases are expanded from the throat to the exit 18 where the gases develop the propulsive thrust for the vehicle to which the rocket engine 8 is attached.

As the gases expand, the over expansion and separation of the flowing gases from the wall 44a will result in a low pressure region in the wall region 107 adjacent the inner wall 44a. The low pressure region and the higher ambient pressure results in a pressure differential which causes the inflow of ambient air along the vent passage 48a through the means 98a, the manifold 88a and the openings 108 in the inner wall 44a to the interior chamber 24 of the engine. The flow, although separated, is stabilized by the inflow of ambient air at a relatively low pressure (that is equal to or less than 14.7 pounds per square inch absolute) into the interior of the nozzle. The flow area available for the incoming flow in the inner wall is approximately twenty per cent of the exit area of the nozzle to ensure that a large volume of the low pressure flow enters. This has the effect of stabilizing the separation point and avoids the separation location moving axially up and down the rocket nozzle with a deleterious effect on rocket stability. In addition, there is a gain in engine efficiency as a result of the decrease in internal drag which results from increasing the pressure force in the wall region to oppose the external ambient pressure force.

Figure 2:
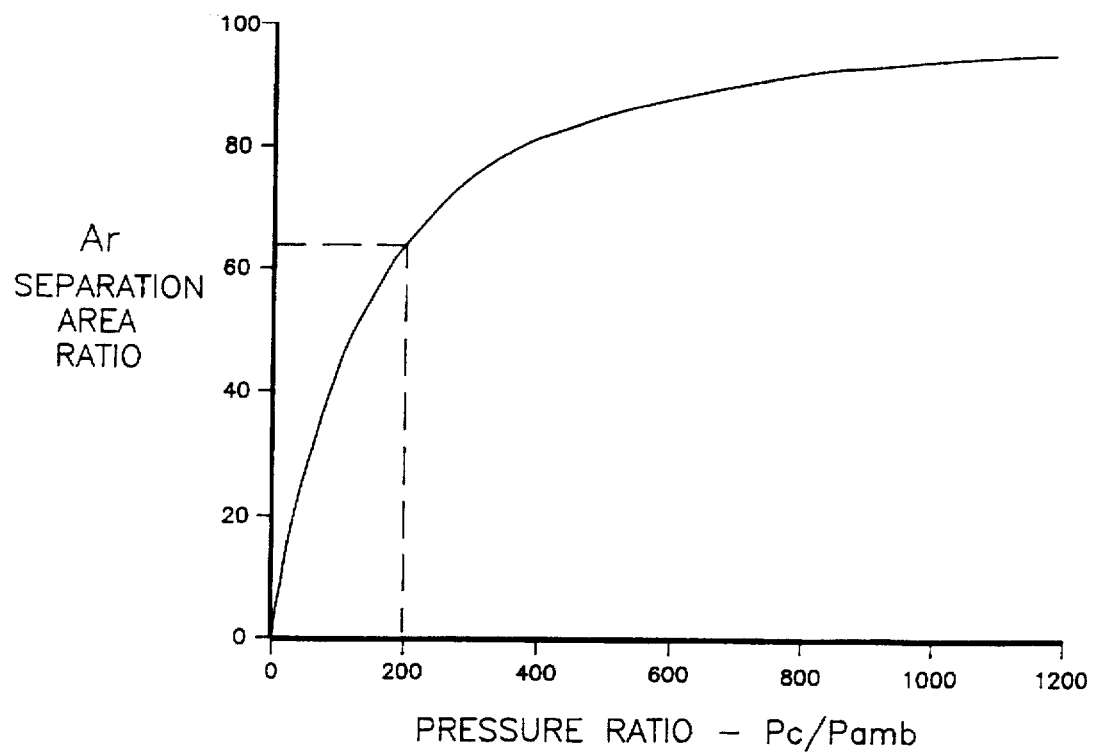
FIG. 2 is an exemplary curve showing the relationship for a particular nozzle of separation area ratio ($A_s$) as a function of pressure ratio $P_r$ of the nozzle.

As the altitude of the vehicle increases, the ambient pressure drops and the pressure ratio increases, causing the separation area ratio to move to an axial location which is past the openings 108. The flow is full to the new axial location, and as a result, the pressure in the wall region exceeds ambient pressure causing the seal element or check valve 98a to close and the separation point moves to a location downstream of the openings 108. For a nozzle having a separation area ratio curve as shown in FIG. 2, it is possible to take into account the pressure ratio and locate the openings 108 so that the location of the separation area ratio stays within the region of the openings 108 of the nozzle.

The operation of the multi-manifolded construction shown in FIG. 4 is similar to the operation of the single manifold construction shown in FIG. 6. It is expected that the stabilized separation point will leap from a location in one manifold to a location in the adjacent manifold as the pressure ratio increases with an increase in vehicle altitude and a concomitant decrease in ambient pressure. It is possible under some conditions that the separated flow might oscillate axially a small amount in the manifold region of one of the manifolds. In this case, the benefit of the invention is the diminution in the magnitude of axial oscillation. Such oscillation are positively diminished by inflow downstream of the separation location that enters through the adjacent downstream manifolds.

As shown in FIG. 8, the seal elements or check valves 98b, 102b, 104b and 106b are controlled by the engine control means 112. The on board computer received either a predicted chamber pressure and ambient pressure signal or actual signals to generate a pressure ratio signal Pr. The actual signals may be direct pressure readings through pressure transducers or analogous signals from which pressure may be determined. For example, an analogous signal for ambient pressure would be an altitude signal for which a correlation exists to ambient pressure.

The pressure ratio signal Pr is fed to a lookup table as represented by the graph $A_r$ v.Pr and the appropriate area ratio $A_r$ is selected so that manifolds axially located upstream of the axial location of the separation area ratio are closed and manifolds at and downstream of the separation area ratio location are open.

As was shown in FIG. 4 and FIG. 6, the perforated nozzle shown in FIG. 10 uses ventilation flow at ambient pressure into the flow path 46 to force and control flow separation at preselected points along the contour of the divergent section of the nozzle. As noted, the ventilation zone extends from an area ratio of 40:1 to an area ratio of 144:1. The perforation zone is limited to the axial locations associated with these area ratios because studies have shown that altitude compensation is more efficient and beneficial at lower altitudes of the vehicle (which are associated with lower area ratios) than at high altitudes which are associated with the high area ratios used for thrust.

The reed elements 98' are closed when the engine is non-operative, but spring open under the pressure differential of approximately one (1) pound per square inch of pressure or greater which is produced between the ambient pressure and the static wall pressure inside the nozzle in the wall region. As the altitude of the vehicle is increased, the ambient pressure decreases and the pressure differential relative to a specific reed valve location decreases, unloading the valve and allowing the valve to close. At a preselected altitude, having an associated ambient pressure, all valves would close to form a high area ratio nozzle contour thus allowing the nozzle to compensate for a change in altitude of the vehicle.

The divergent region 17 of the nozzle shown in FIG. 14 will operate in similar fashion to the nozzle shown in FIG. 10, providing altitude compensation by relying on ambient flow ventilation to force and control flow separation. The ventilation is required throughout a wider range of area ratios because the circumferential locations of the ambient vent passages 48,52,54,56 are not as evenly distributed as in the FIG. 10 embodiment. Accordingly, ventilation is required throughout a wider range of area ratios, from area ratio 40:1 to an area ratio of 200:1, to accomplish the same effect as in the FIG. 10 construction.

The vent passages are blocked by the carbon-carbon composite doors 98" which are each hinged with a spring 138 at the forward end 136. The doors are actuated by the relative differential pressure at the location of the doors and close as the vehicle gains altitude. As mentioned, the doors located at area ratios of 40:1 and 80:1 receive additional cooling, either by injecting small amounts of hydrogen into the flowpath via holes 164 or by condensing water vapor which is formed as a product of combustion.

As shown in FIG. 17, it is possible to supply large quantities of pressurized ventilation gases via the manifold 88e in conjunction with a computer operated vent door 176. It is expected that the large volume of gases will be supplied at a slightly increased pressure which is lower than twenty (20) pounds per square inch. One source of the pressurized gas is the liquid hydrogen fuel which could be expanded into the exhaust nozzle. This will have a slight adverse impact on engine efficiency because the hydrogen is not used in the combustion chamber.

In both the FIG. 10 and FIG. 14 constructions, the cooling tubes are specially contoured to cool the regenerative tubes to a temperature which is less than fifty per cent of the temperature required for structural stability. Sub-cooling the tubes cools gases in the flow path which contain water vapor well below the saturation temperature characteristic (that is, the temperature at which water condenses at the local pressure) of the gases. This causes water to condense in the boundary layer of the regenerative by cooled portion of the nozzle. The water condensate provides additional cooling to the downstream radiation cooled extension in the divergent portion of the nozzle. For example, well over two-tenths of a pound of water per second can be generated at the end of the extension over an axial wall temperature gradient from about 300° R. to about 550° R.

Because the primary exhaust gas of a hydrogen oxygen combustion chamber is essentially high temperature steam, this film coolant, water, is interinternally generated within the nozzle. Generally speaking, the water will be generated when the surface temperature of the wall is cooled below approximately five hundred and sixty degrees Rankine (560° R.). One of the major advantages of this technique is its relative simplicity.

Figure 18:
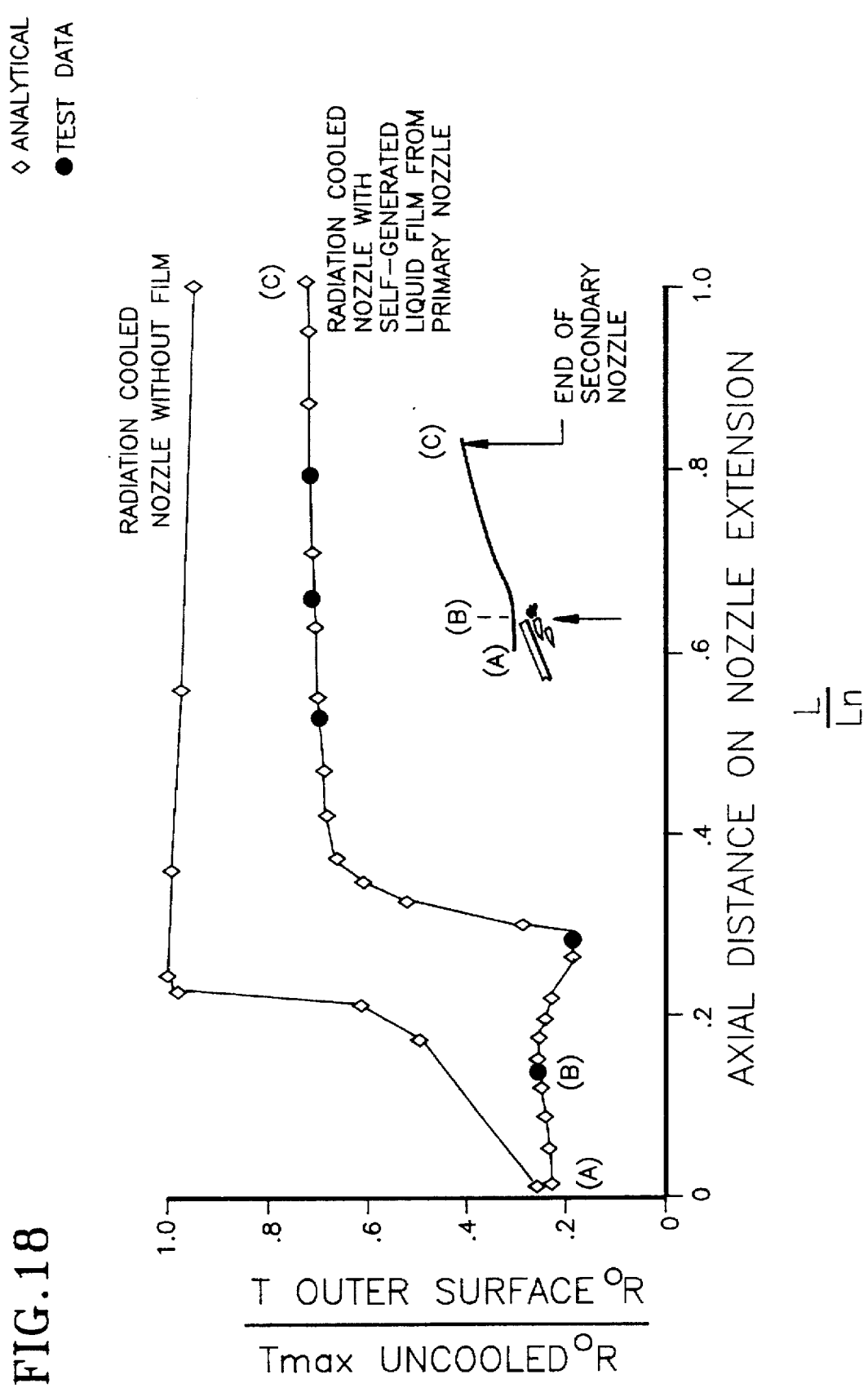
FIG. 18 is a graphical representation of wall temperature versus axial location for a water cooled extension.

FIG. 18 illustrates the reduction in downstream wall temperature that this mechanism can produce. Location A corresponds to a point slightly upstream of the interface between the second section 26 and the third section 28. Location B is immediately adjacent the second section and the third section, and location C is the end of the nozzle extension. The temperature is normalized by dividing the surface temperature of the extension by the maximum temperature of the extension. The length is normalized by dividing the axial location by the overall length of the secondary nozzle.

As will be realized, the nozzle can be operated within temperature limits which provide for specialized cooling at specialized locations; and, with a high area ratio bell nozzle over a wide range of pressure ratios even at low pressure ratios which cause separation, by avoiding the large fluctuating side loads due to unstable flow separation. As a result, improvements in thrust both at low altitudes and high altitudes are obtained from a single large area ratio nozzle which is tolerant of pressure ratio ranges much larger than heretofore used for a single nozzle. This provides for adequate thrust at liftoff and for efficient thrust production at high altitudes.

Although the invention has been shown and described with respect to detailed embodiments thereof, it should be understood by those skilled in the art that various changes in form and detail thereof may be made without departing from the spirit and scope of the claimed invention.

I claim:

1. A rocket engine of the type having rocket nozzle structure which has a flowpath for rocket gases extending axially through the nozzle, the nozzle structure including a casing which bounds the flowpath, the casing having a throat and a divergent region extending downstream from the throat, the divergent region having a high expansion ratio and the nozzle having a full flow region and a separated flow region under at least one operative condition of the the engine, wherein the improvement comprises:

a casing having a divergent region which bounds the flowpath for rocket gases, the casing including,
      an inner wall having a plurality of openings in flow communication with the flowpath for rocket gases;
      an outer wall spaced outwardly from the inner wall leaving a cavity therebetween, the outer wall having at least one first opening and at least one second opening which are in flow communication with the cavity,
      divider means extending between the inner wall and the outer wall to divide the cavity into a first manifold and a second manifold, two manifolds being axially adjacent one to the other and extending circumferentially about the casing between the inner wall and the outer wall,
   a plurality of vent passages, at least one of which at the first manifold extends from the exterior of the casing through the first opening in the outer wall, through the first manifold, and through an opening in the inner wall to the interior of the casing, and at least one of which at the second manifold extends from the exterior of the casing through the second opening in the outer wall, through the second manifold, and through an opening in the inner wall to the interior of the casing; and, means for placing each vent passage in flow communication with the exterior and with the interior to allow flow through the vent passage from the exterior to the interior and for blocking flow from the interior to the exterior, the means being responsive to the total pressure of the interior of the nozzle and the pressure at the exterior of the nozzle;

wherein the means permits flow through vent passages from the exterior to the interior into the associated manifold to distribute pressurized gases along an axial length of the casing adjacent the separated flow region and blocks flow through vent passages from the interior to the exterior in full flow regions of the nozzle.

2. The rocket engine of claim 1 wherein the engine further includes a source of pressurized gases which is in flow communication with the exterior of the casing at a higher static pressure than the static pressure in the region of the wall on the interior of the casing at a location adjacent at least one vent passage and wherein said source of gas is in flow communication with at least one of said vent passages.

3. The rocket engine of claim 1 wherein the means for placing the vent passage in flow communication with the exterior includes a wall element positionable by actuator means for positioning the wall element, control means for the rocket engine which is responsive to the pressure ratio of the nozzle for generating a signal to an actuator means to position the wall element, and an actuator means for positioning the wall element in response to said signal.

4. The rocket engine of claim 1 wherein the means for placing the vent passage in flow communication with the exterior is a valve means for permitting flow or blocking flow which is responsive to the pressure ratio of the nozzle.

5. The rocket engine of claim 1 wherein the inner wall has a plurality of slots extending axially and circumferentially in the first wall and disposed within said manifold and wherein at least one vent passage extends through each slot.

6. The rocket engine of claim 5 wherein at least one slot has a low aspect ratio with respect to the axial direction.

7. The rocket engine of claim 5 wherein at least one slot has a high aspect ratio with respect to the axial direction.

* * * * *